(12) United States Patent
Tsuji (10) Patent No.: US 8,347,032 B2
(45) Date of Patent: Jan. 1, 2013

(54) IMAGE FORMING APPARATUS AND ACCESS REQUEST ARBITRATION METHOD FOR A RAID DRIVER

(75) Inventor: Syuntaro Tsuji, Osaka (JP)

(73) Assignee: KYOCERA Document Solutions Inc. (JP)

( * ) Notice: Subject to any disclaimer, the term of this patent is extended or adjusted under 35 U.S.C. 154(b) by 567 days.

(21) Appl. No.: 12/564,676

(22) Filed: Sep. 22, 2009

(65) Prior Publication Data

US 2010/0169573 A1    Jul. 1, 2010

(30) Foreign Application Priority Data

Dec. 25, 2008    (JP) ................................. 2008-328953

(51) Int. Cl.
*G06F 12/08* (2006.01)
(52) U.S. Cl. ......... 711/114; 711/100; 711/154; 711/158
(58) Field of Classification Search ................... 711/100, 711/114, 154, 158, E12.019
See application file for complete search history.

(56) References Cited

U.S. PATENT DOCUMENTS

| | | | |
|---|---|---|---|
| 7,490,185 B2 * | 2/2009 | Morishima et al. ........... 710/113 | |
| 2002/0188802 A1 | 12/2002 | Yagisawa et al. | |
| 2003/0028727 A1 * | 2/2003 | Kochiya ......................... 711/114 | |
| 2005/0102480 A1 | 5/2005 | Yagisawa et al. | |

FOREIGN PATENT DOCUMENTS

| | | |
|---|---|---|
| JP | 06-259198 | 9/1994 |
| JP | 2000-242441 | 9/2000 |
| JP | 2001-222382 | 8/2001 |

OTHER PUBLICATIONS

Intel Matrix Storage Manager: "What is Matrix RAID?" http://www.intel.com/support/chipsets/imsm/sb/cs-020681.htm; Jul. 23, 2009.

* cited by examiner

*Primary Examiner* — Jasmine Song
(74) *Attorney, Agent, or Firm* — McDonnell Boehnen Hulbert & Berghoff LLP (57) ABSTRACT

An image forming apparatus includes a RAID control unit comprising an access request queue and an access request arbitrating unit configured to store access requests to a logical disk sent from an operating system in the access request queue on the basis of fetch order determination information, and to fetch the access requests. An access arbitration method for a RAID driver comprises the steps of storing the access requests in an access request queue on the basis of fetch order determination information, converting logical disk access information contained in access information corresponding to the access requests into physical disk access information, and supplying the access information containing the physical disk access information to a RAID controller.

14 Claims, 9 Drawing Sheets

FIG.9 ly apparent from the following detailed description
IMAGE FORMING APPARATUS AND ACCESS REQUEST ARBITRATION METHOD FOR A RAID DRIVER

INCORPORATION BY REFERENCE

This application is based upon and claims the benefit of priority from corresponding Japanese Patent Application No. 2008-328953, filed Dec. 25, 2008, the entire contents of which are incorporated herein by reference.

BACKGROUND

1. Field of the Invention

The present invention relates to an image forming apparatus having an operating system (OS) and a Redundant Array of Inexpensive/Independent Disks (RAID) control unit, and relates to an access request arbitration method for a RAID control unit.

2. Description of the Related Art

In a RAID system, a plurality of hard disk drives (HDDs) can be configured to appear as a single drive to an OS. This virtual single drive may comprise a plurality of logical drives. For example, a plurality of HDDs can form a logical disk in a striping mode (RAID-0 mode) providing high-speed data access or can form a logical disk for a mirroring mode (RAID-1 mode) providing improved reliability.

However, when two HDDs comprise multiple logical disks operating in a RAID-0 mode and a RAID-1 mode, for example, the two HDDs are accessed in parallel in both modes. Therefore, it is not possible to access the two HDDs via both of the modes at the same time. On the other hand, the OS recognizes the HDDs as separate logical disks for RAID-0 mode and RAID-1 mode, resulting in conflicting access requests. However, since there has been no technique for performing arbitration to resolve such access conflicts, it may happen that conflicting access requests are rejected and that an access request in the RAID-0 mode for high-speed access is given a low priority.

SUMMARY

The present invention relates to an image forming apparatus having a Redundant Array of Inexpensive/Independent Disks (RAID) control unit capable of appropriately arbitrating conflicting access requests to a physical disk, and relates to an access request arbitration method for a RAID control unit.

According to an embodiment of the present invention, an image forming apparatus having a RAID control unit comprises an access request queue and an access request arbitrating unit configured to store access requests to a logical disk sent from an operating system (OS) on the basis of fetch order determination information and to fetch the access requests.

According to an embodiment of the present invention, the image forming apparatus having the RAID control unit may further comprise an access information converting unit configured to receive the fetched access requests from the access request queue, convert logical disk access information corresponding to the access request into physical disk access information by referring to address conversion information, and send a request for transferring of access information that contains the physical disk access information.

According to an embodiment of the present invention, the image forming apparatus having the RAID control unit may further comprise a transferring unit configured to transfer the access information to a RAID controller in response to the transfer request sent by the access information converting unit.

According to an embodiment of the present invention, an access arbitration method for a RAID driver comprises a step of storing access requests in an access request queue on the basis of fetch order determination information, a step of converting logical disk access information contained in access information corresponding to the access requests into physical disk access information, and a step of supplying the access information containing the physical disk access information to a RAID controller.

Additional features and advantages are described herein, and will be apparent from the following detailed description and figures.

DETAILED DESCRIPTION

<A First Embodiment>

Figure 8:
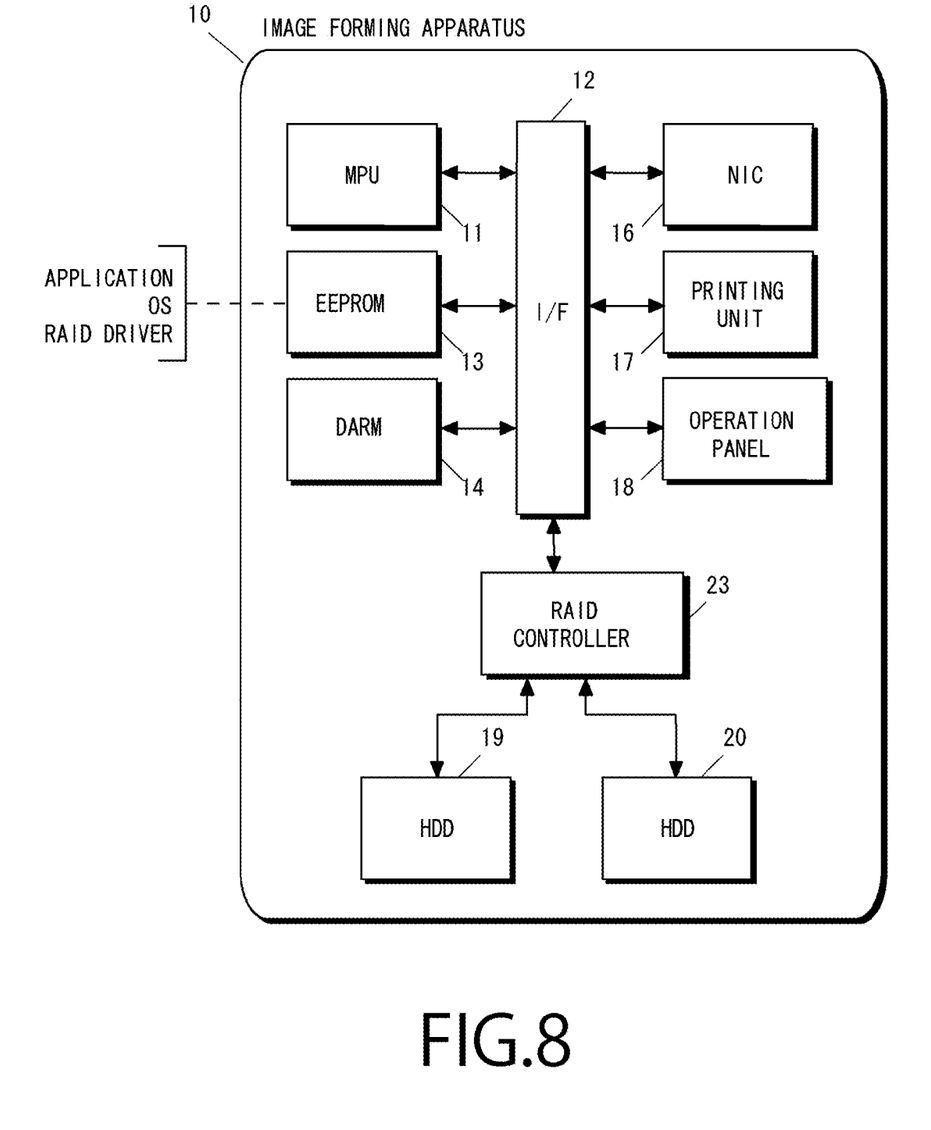
FIG. 8 is a block diagram illustrating a hardware configuration of an image forming apparatus according to the first embodiment of the present invention.

FIG. 8 is a schematic block diagram illustrating a hardware configuration of an image forming apparatus according to a first embodiment of the present invention.

An image forming apparatus 10 includes a micro processing unit (MPU) 11, an electrically erasable programmable read-only memory (EEPROM) 13, a dynamic random access memory (DRAM) 14, a Redundant Array of Inexpensive/Independent (RAID) controller 23, a network interface card (NIC) 16, a printing unit 17, and an operation panel 18 that are all connected via an interface 12. For simplicity, in FIG. 8, what may constitute a plurality of interfaces are all illustrated via one block 12.

The EEPROM 13 may be a flash memory, for example. The EEPROM 13 stores a plurality of applications operating in an upper layer of an operating system (OS), such as the Linux (R) OS, employing a virtual storage system. The EEPROM 13 also stores various drivers including a RAID driver operating in a lower layer of the OS.

The DRAM 14 serves as a main memory.

The printing unit 17 may include a print engine, a sheet feeder, a sheet conveyor, and a sheet ejector. The printing unit 17 forms an electrostatic latent image on a photosensitive drum of the print engine on the basis of bitmap data and develops the electrostatic latent image using a toner. The printing unit 17 then transfers and fixes the toner image onto a sheet and ejects the sheet.

Figure 1:
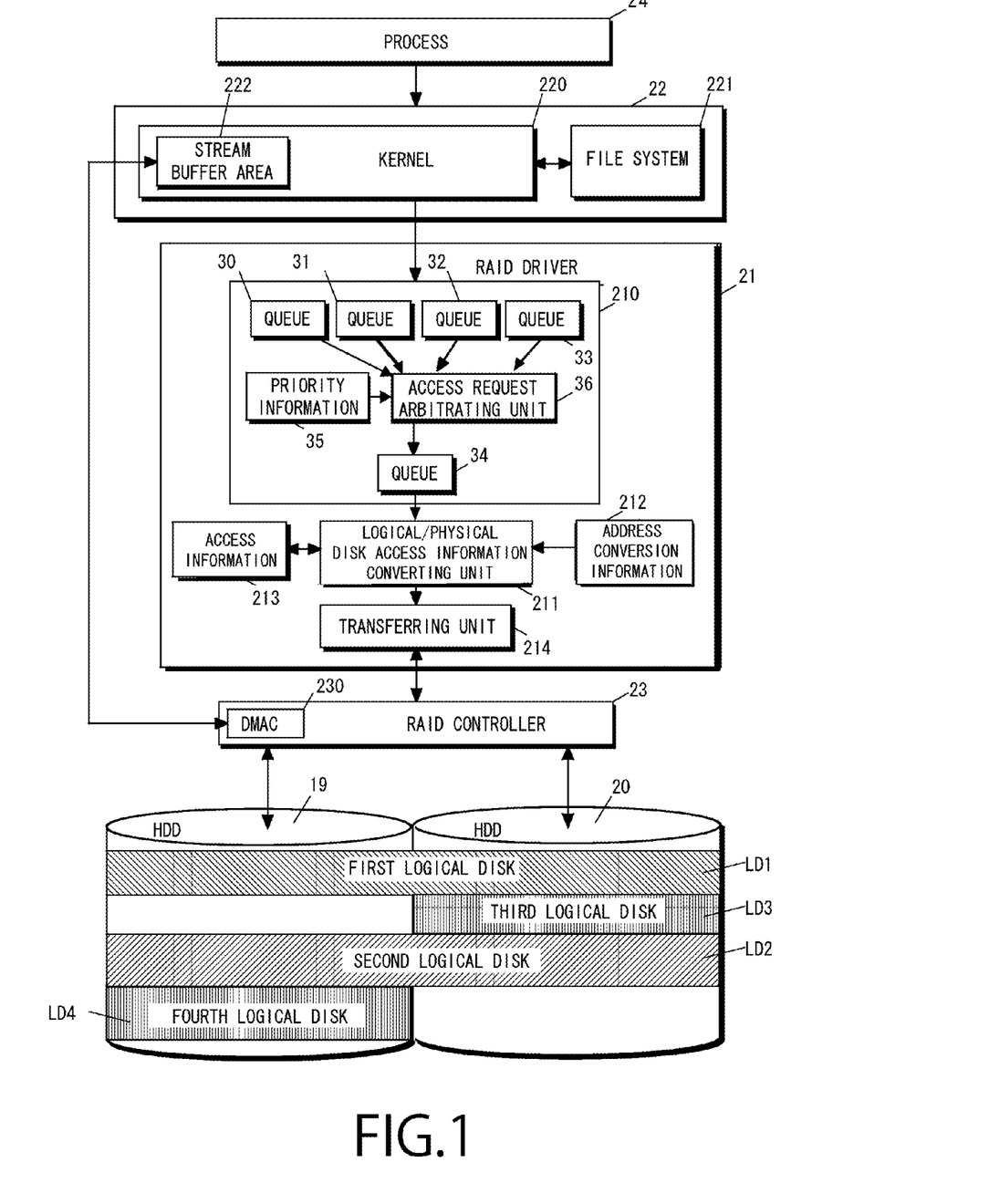
FIG. 1 is a schematic block diagram illustrating a configuration relating to a Redundant Array of Inexpensive/Independent Disks (RAID) driver according to a first embodiment.

FIG. 1 is a schematic block diagram illustrating a configuration relating to a RAID driver 21 according to the first embodiment of the present invention. In FIG. 1, hard disk drives (HDDs) 19, 20 and the RAID controller 23 are configured in hardware. The other components illustrated in FIG. 1 are configured in software to be loaded to the DRAM 14 when executed.

The HDD 19 and the HDD 20 include logical disks LD1, LD2, LD3, and LD4. The logical disks LD1 and LD2 are created in corresponding areas of the HDD 19 and the HDD 20 and the OS 22 may attempt accesses to both the HDD 19 and 20 at the same time in the RAID-0 mode and RAID-1 mode, respectively. The logical disks LD3 and LD4 are both accessed in a normal mode (single mode) and created in the HDD 20 and the HDD 19, respectively.

The RAID driver 21 serves as an interface between an OS 22 and the RAID controller 23.

The OS 22 includes a kernel 220 and a file system 221. When a process 24 is to access a file, the process 24 performs a file open system call to the kernel 220 such that a file path and an access mode such as read and write are specified. In response to the system call, the kernel 220 reserves a stream buffer area 222 in a kernel memory area and sends an identifier of the stream buffer area 222 to the process 24. The process 24 thereafter can access the stream buffer area 222 through the kernel 220 by specifying the identifier and the number of bytes, thereby indirectly accessing the file.

The kernel 220 obtains a head logical block address (LBA) of the file specified by the file path by referring to the file system 221. The kernel 220 sends the RAID driver 21 a file access request by specifying access information comprising a logical disk name included in the path, the LBA, the number of necessary blocks, and the head address for access in the stream buffer area 222. The size of one block may be equal to one sector (512 bytes, for example). The RAID driver 21 copies the above access information to a control block (CB) as illustrated in FIG. 6(B), and stores an address pointer *CB that is the head address of the CB (the content of a pointer designating the CB) in a queue as an access request identifier (hereinafter, referred to as an access request).

In response to the request from the process 24, the OS 22 sends the RAID driver 21 a request for access to the logical disks LD1 to LD4 without considering the physical configuration of the logical disks LD1 to LD4.

However, only one of the logical disks LD1-LD4 can be accessed at the same time. Thus, a conflict between multiple access requests sent from the OS 22 to the RAID driver 21 may occur.

The RAID driver 21 performs arbitration between the conflicting access requests via an access order determining unit 210 in a manner described below.

Figure 6B:
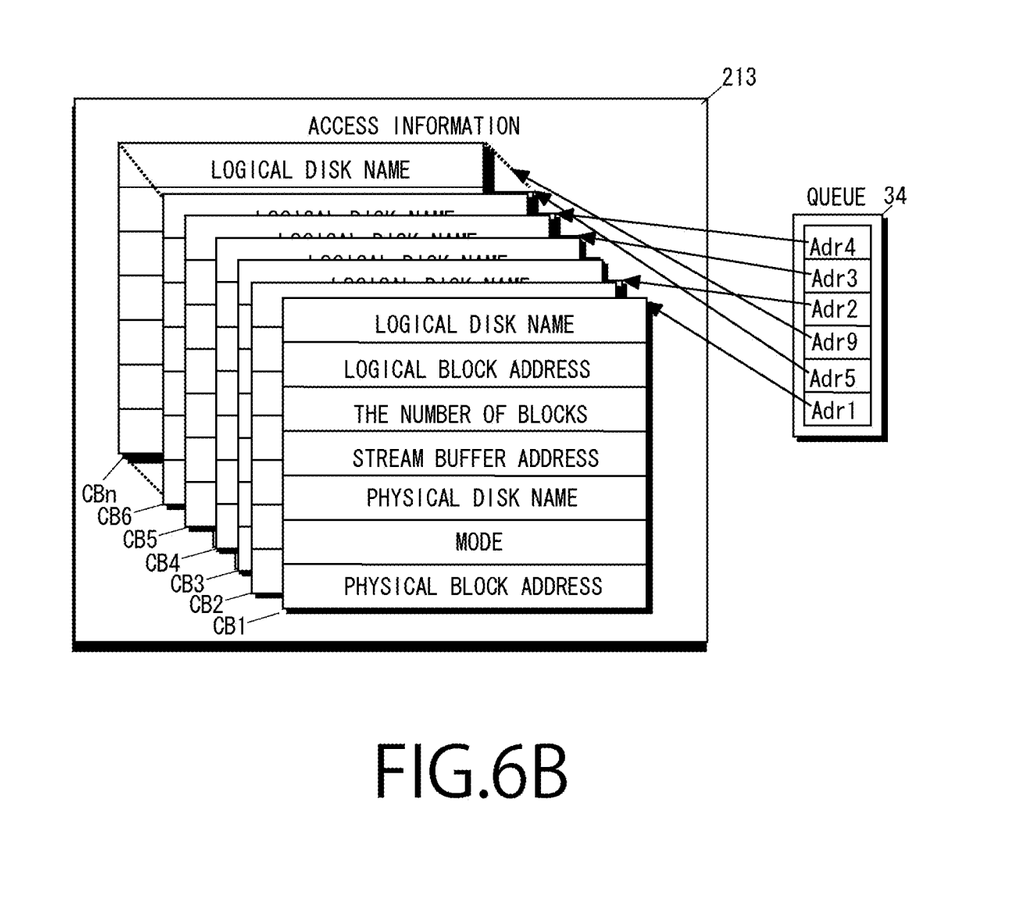
FIG. 6(B) illustrates items contained in access information and a relationship between the access information and a queue.
Figure 7:
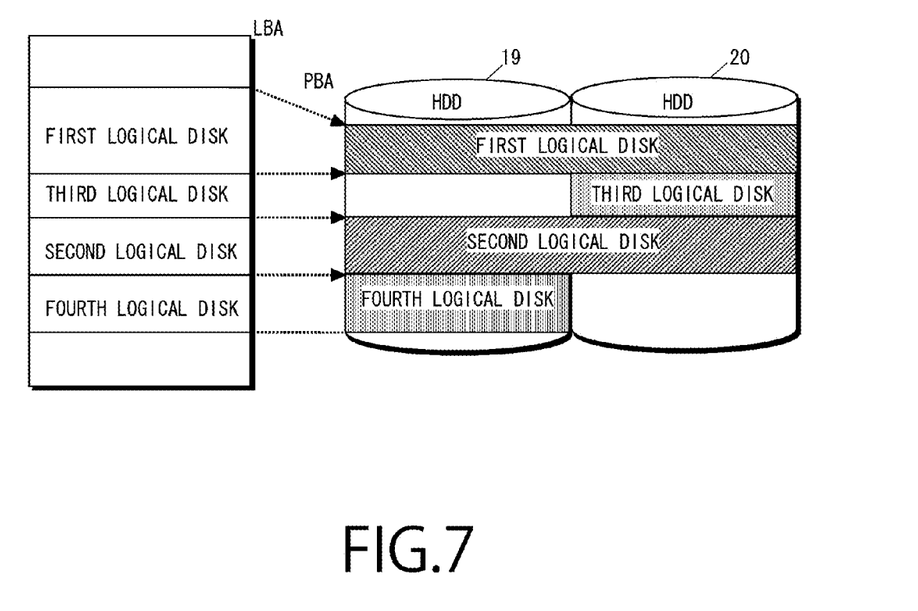
FIG. 7 illustrates a relationship between logical block addresses (LBAs) and physical block addresses (PBAs)

A logical/physical disk access information converting unit 211 of the RAID driver 21 receives an arbitrated access request from the access order determining unit 210. The logical/physical disk access information converting unit 211 refers to address conversion information 212 to convert logical disk information contained in the access information corresponding to the access request into physical disk information. Specifically, the logical/physical disk access information converting unit 211 converts a logical disk name and an LBA into a physical disk name and a physical block address (PBA), respectively (illustrated in FIG. 7). Further, the logical/physical disk access information converting unit 211 determines a mode to be included in the physical disk information on the basis of the correspondence between logical disks and modes (RAID-0 mode, RAID-1 mode, and single mode, in this embodiment), that is described in the address conversion information 212. The logical/physical disk access information converting unit 211 writes the converted and determined physical disk information to a corresponding CB in access information 213 illustrated in FIG. 6(B). A difference between an LBA and a PBA is a constant defined for each logical disk.

The logical/physical disk access information converting unit 211 sends a transferring unit 214 a data transfer request by specifying the pointer *CB (the head address of the CB). In response to the data transfer request, the transferring unit 214 transfers to the RAID controller 23 the physical disk name, PBA, mode, the number of blocks, and/or the *CB for access in the stream buffer area 222 that are contained in the CB.

In response to the transfer, the RAID controller 23 executes the mode corresponding to the physical disk access information and sends an access request to the HDD 19 and/or the HDD 20. The RAID controller 23 is provided with a DMA (direct memory access) controller 230. When the access request is a read request, using the DMA controller 230, the RAID controller 23 transfers data read from the HDD 19 and/or the HDD 20 to the stream buffer area 222, by [(number of blocks)×512 bytes] beginning from the corresponding *CB address for access to the stream buffer area 222. When the access request is a write request, using the DMA controller 230, the RAID controller 23 similarly transfers data from the stream buffer area 222 to the HDD 19 and/or the HDD 20. Each of the HDD 19 and the HDD 20 includes a hard disk controller and a buffer memory, so that data communication between the RAID controller 23 and the buffer memory can be performed via the hard disk controller.

The access order determining unit 210 includes first-level queues 30-33 (example for pre-access request queues) for temporary storage, corresponding to the logical disks LD1-LD4, respectively. And the access order determining unit 210 includes a second-level queue (example for access request queue) 34, priority information 35 indicating a priority of each logical disk LD1-LD4, and an access request arbitrating unit 36 for performing arbitration control. The access request arbitrating unit 36 determines which one of the access requests (*CBs, i.e., Adr1,2,3,4,5,9 in FIG. 6(B)) stored in the respective queues 30-33 is to be fetched, at a predetermined timing, on the basis of the number of the access requests and the priority information 35. The access request arbitrating unit 36 fetches the determined access request and inputs the access request to the queue 34.

Operations of the access request arbitrating unit 36 will be described below.

Figure 4:
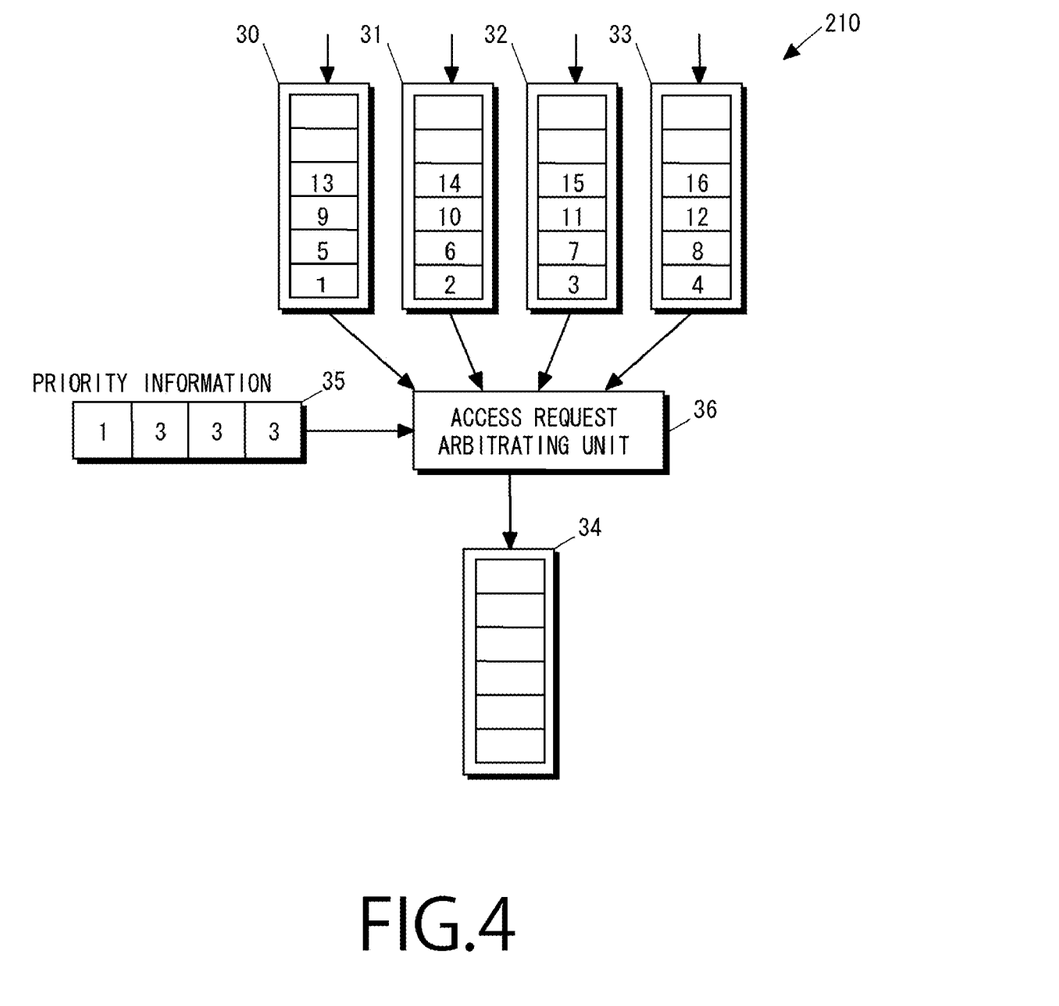
FIG. 4 illustrates in detail the operations of the access request arbitrating unit after the process set forth in FIG. 2(B)

In FIG. 4, it is assumed that a user sets priority levels of the logical disks LD1 to LD4 as 1, 3, 3, 3 (a smaller value indicating a higher priority), respectively. And it is assumed that each of the queues 30-33 stores four access requests in the waiting state. The numbers shown in the queues 30-33 in FIG. 4 indicate the order that the access requests have been transmitted from the OS 22 to the RAID driver 21.

The access request arbitrating unit 36 selects and fetches one access request that has the greatest fetch order determination value [(GO), where GO=(the number of access requests N)/(priority level P)] from the queues 30-33. The access request arbitrating unit 36 inputs the fetched access request to the queue 34.

FIG. 5A to FIG. 5F illustrate state transitions that occur when the access request arbitrating unit 36 transfers access requests from the queues 30-33 to the queue 34 on the basis of the GO.

In the state illustrated in FIG. 4, the GOs of the queues 30-33 are 4/1, 4/3, 4/3, and 4/3, respectively. Thus, an access request 1 in the queue 30 is selected and input to the queue 34, resulting in the state illustrated in FIG. 5(A).

Figure 5A:
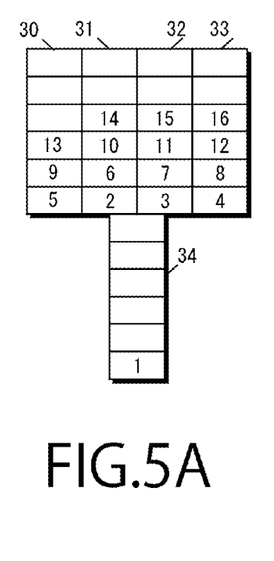
FIGS. 5A-5F illustrate state transitions as the access request arbitrating unit transfers access requests from queues 30-33 to a queue 34 by fetch order determination value.

In the state illustrated in FIG. 5(A), the GOs of the queues 30-33 are 3/1, 4/3, 4/3, and 4/3, respectively. Thus, an access request 5 in the queue 30 is selected and input to the queue 34, resulting in the state illustrated in FIG. 5B.

Figure 5B:
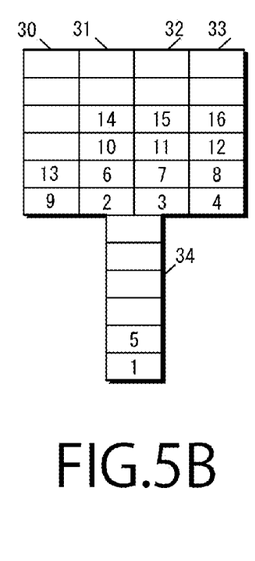
Figure 5C:
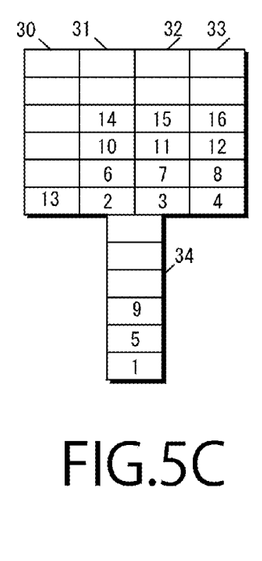

In the state illustrated in FIG. 5(B), the GOs of the queues 30-33 are 2/1, 4/3, 4/3, and 4/3, respectively. Thus, an access request 9 in the queue 30 is selected and input to the queue 34, resulting in the state illustrated in FIG. 5C. In the state illustrated in FIG. 5(C), the GOs of the queues 30-33 are 1/1, 4/3, 4/3, and 4/3, respectively. Thus, an access request 2 in the queue 31 is selected and input to the queue 34, resulting in the state illustrated in FIG. 5D.

Figure 5D:
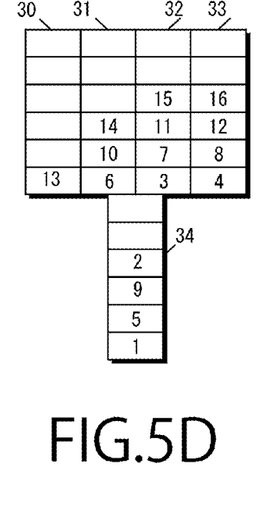

In the state illustrated in FIG. 5(D), the GOs of the queues 30-33 are 1/1, 3/3, 4/3, and 4/3, respectively. Thus, an access request 3 in the queue 32 is selected and input to the queue 34, resulting in the state illustrated in FIG. 5E.

Figure 5E:
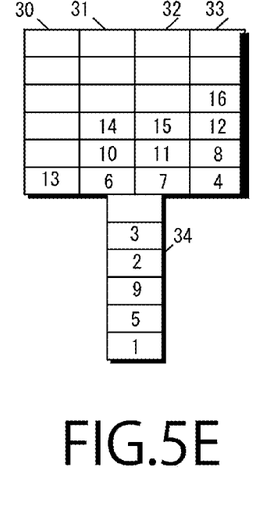

In the state illustrated in FIG. 5(E), the GOs of the queues 30-33 are 1/1, 3/3, 3/3, and 4/3, respectively. Thus, an access request 4 in the queue 33 is selected and input to the queue 34, resulting in the state illustrated in FIG. 5F.

Figure 5F:
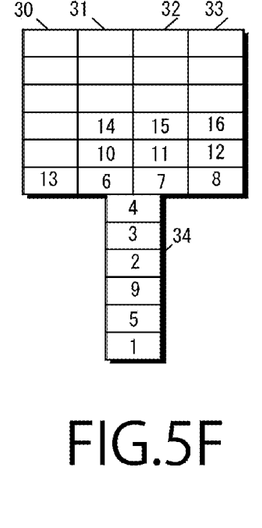

When the state illustrated in FIG. 5(F) is reached, the RAID controller 23 fetches an access request from the queue 34 at every time that a ready state is entered. When the queue 34 is empty, the access request arbitrating unit 36 performs the above process of access request transferring from the queues 30-33 to the queue 34.

Figure 6A:
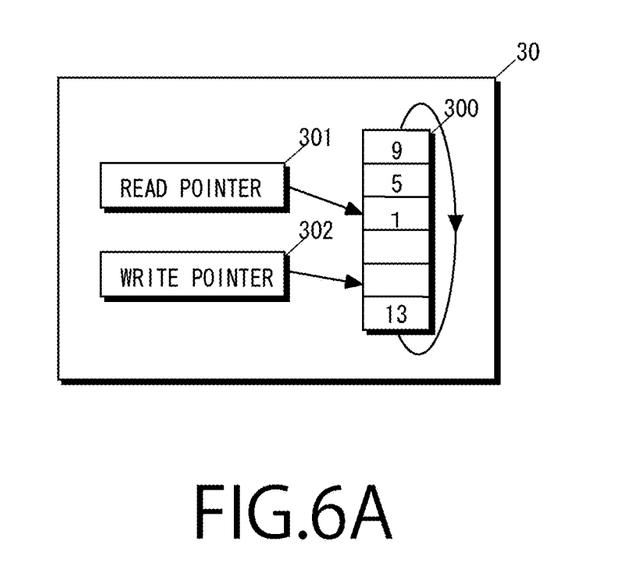
FIG. 6(A) illustrates a structure of a queue.

As illustrated in FIG. 6(A), the queue 30 includes a one-dimensional array 300, a read pointer 301 and a write pointer 302 for specifying an element in the one-dimensional array 300. The contents of the read pointer 301 and the write pointer 302 are updated such that a loop of a logical sequence that the elements are used is formed.

The write pointer 302 is decremented when a new *CB is stored in the element of the one-dimensional array 300 correspondingly. The read pointer 301 is decremented when the content of an element of the one-dimensional array 300 is read out. When the element in the one-dimensional array 300 designated by the read pointer 301 or the write pointer 302 indicates a head element, an address of a last element of the one-dimensional array 300 is written to the read pointer 301 or the write pointer 302, instead of decrementing the pointers. The number of access requests stored in the queue 30 is determined on the basis of the values of the read pointer 301 and the write pointer 302.

The number of access requests stored in the queues 31-34 is determined similarly to the queue 30.

Figure 2A:
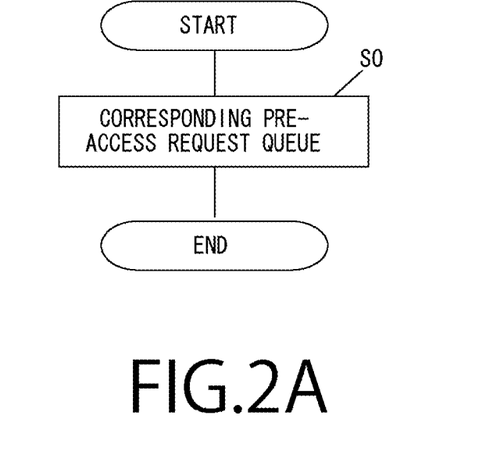
FIG. 2(A) is a flowchart illustrating a process performed by an access request arbitrating unit that is started in response to an access request sent from a kernel to a RAID driver.
Figure 2B:
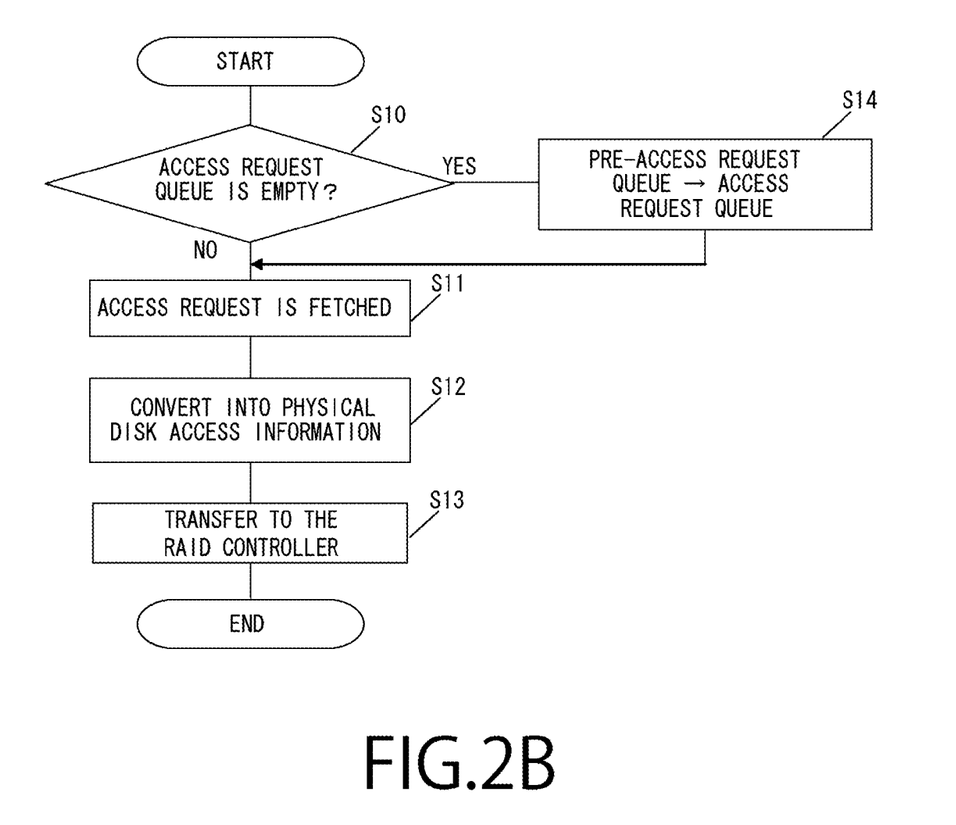
FIG. 2(B) is a flowchart illustrating a process performed by the access request arbitrating unit that is executed after the process of FIG. 2(A) is terminated, and that is initiated by an interrupt that occurs when the RAID controller enters a ready state.

FIG. 2(A) and FIG. 2(B) are flowcharts each illustrating a process performed by the access request arbitrating unit 36. The procedure illustrated in FIG. 2(A) is started in response to an access request sent from the kernel 220 to the RAID driver 21.

For example, at Step S1, when the access request is a request for access to the logical disk LD1, the *CB of a corresponding CB is input to the queue 30. When the access request is a request for access to the logical disk LD2, the *CB of a corresponding CB is input to the queue 31. When the access request is a request for access to the logical disk LD3, the *CB of a corresponding CB is input to the queue 32. When the access request is a request for access to the logical disk LD4, the *CB of a corresponding CB is input to the queue 33.

The process illustrated in FIG. 2(B) is started when the process illustrated in FIG. 2(A) is completed, or is started by an interrupt assertion that occurs when the RAID controller 23 enters the ready state.

At Step S10, it is determined whether or not the queue 34 is empty. If the queue 34 is not empty, the process proceeds to Step S11. If the queue 34 is empty, the procedure proceeds to Step S14.

At Step S11, one access request is fetched from the queue 34.

At Step S12, logical disk access information corresponding to the access request is converted into physical disk access information, and the converted access information is written to the corresponding CB.

At Step S13, if the RAID controller 23 is in the ready state, the CB is transferred to the RAID controller 23 by the transferring unit 214, and the process illustrated in FIG. 2(B) is terminated.

At Step S14, the process of access request transferring from the queues 30-33 to the queue 34 is performed, and then the process proceeds to Step S11.

Figure 3:
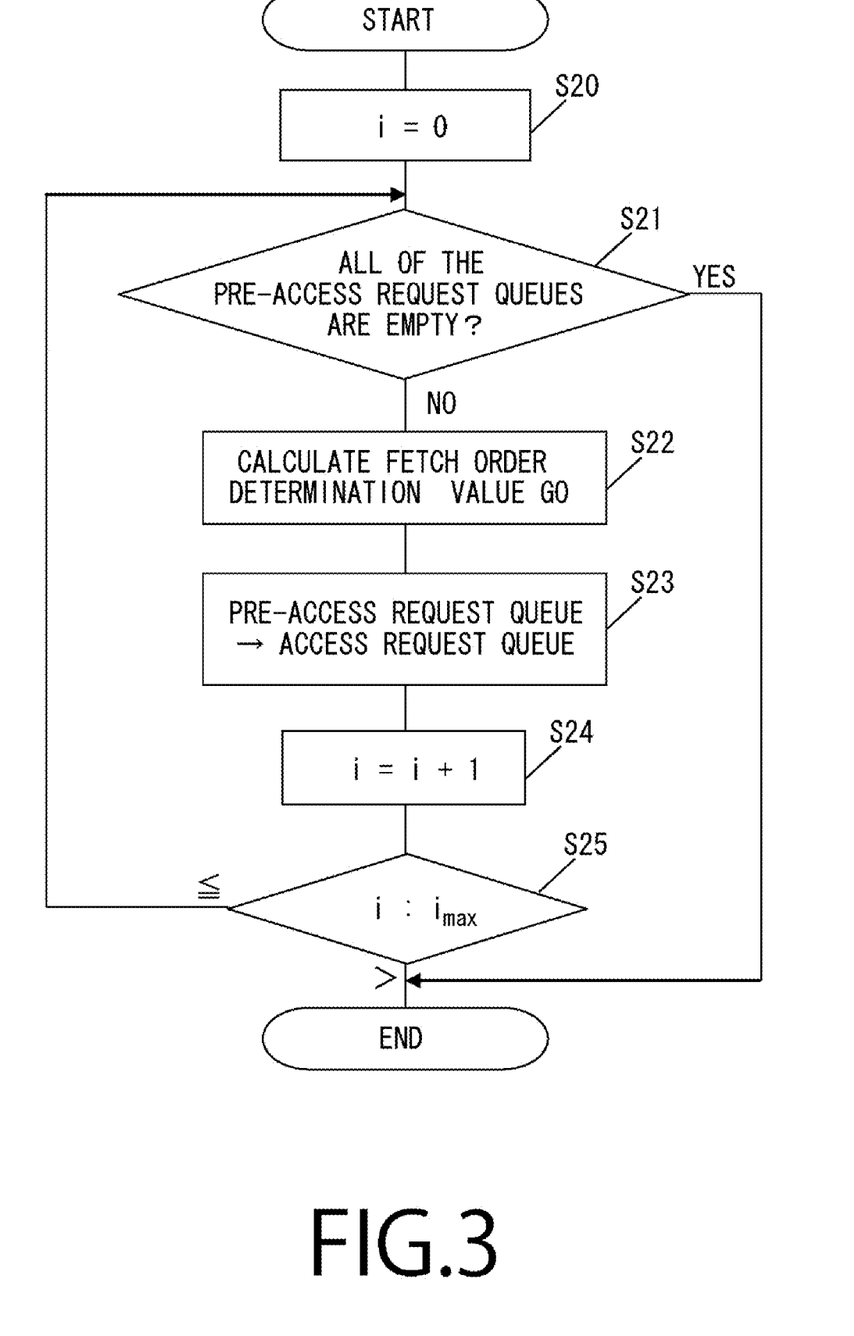
FIG. 3 is a flowchart illustrating in detail the process of step S14 of FIG. 2(B)

FIG. 3 is a flowchart illustrating in detail the process of Step S14 in FIG. 2(B).

At Step S20, an initial value 0 is assigned to a variable that indicates the number of access requests stored in the queue 34.

At Step S21, it is determined whether the queues 30-33 are empty. If one of the queues 30-33 is not empty, the procedure proceeds to Step S22. If all of the queues 30-33 are empty, the process is terminated.

At Step S22, the GOs of the queues 30-33 are calculated. At Step S23, one access request that has the largest GO is fetched from the queues 30-33, and the fetched access request is input to the queue 34.

At Step S24, the variable i is incremented by 1. At Step S25, it is determined whether $[I \leq i_{max}]$ is satisfied. If $[I \leq i_{max}]$ is satisfied, the process returns to Step S21. If $[I \leq i_{max}]$ is not satisfied, the process is terminated. For example, $i_{max}$ may be 6.

By the process of FIGS. 2(A), 2(B), and 3, the state illustrated in FIG. 4 is sequentially transitioned to the states illustrated in FIGS. 5A to 5F. And the access request is fetched from the queue 34 to access the HDD 19 and/or the HDD 20.

When a plurality of access requests are stored in any of the queues 30-33 at the timing that the queue 34 becomes empty (that is, the process of Step S10 proceeds to Step S14), the GO is determined not only based on the priority levels of the queues 30-33, but also on the number of the access requests of the queues 30-33. The HDD 19 and the HDD 20 can be accessed on the basis of the result of appropriately rearranging the order of the access requests.

Accordingly, for example, a delay of processing an access request can be prevented in the striping mode (RAID-0 mode) for high-speed processes. And expected operations of the striping mode are still performed. In addition, access delay can also be prevented in the mirroring mode (RAID-1 mode) for reliability even when access conflicts occur, by increasing the priority level of a disk corresponding to the RAID-1 mode.

It should be noted that the process of Step S14 based on the above rule is not limited to the case illustrated in FIG. 3. Another process will be described below as a second embodiment of the present invention.

<A Second Embodiment>

Figure 9:
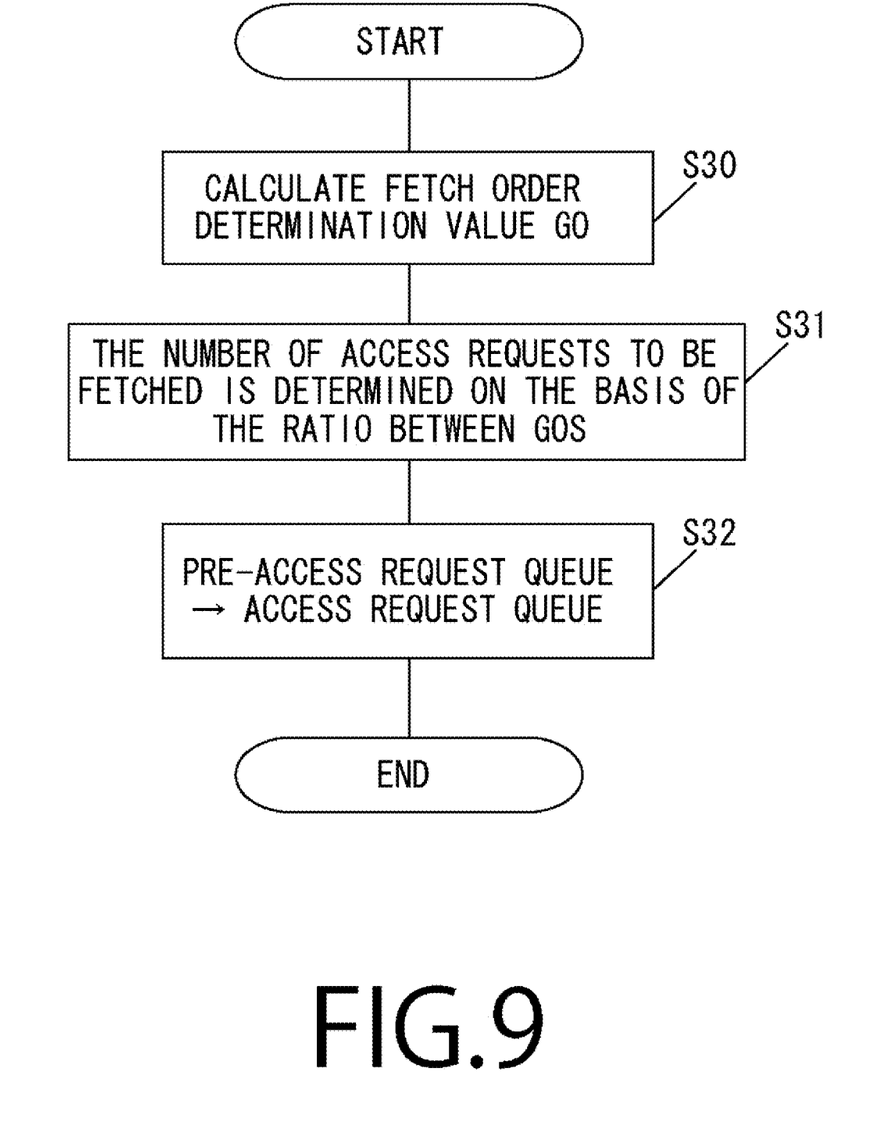
FIG. 9 is a flowchart illustrating a process according to a second embodiment of the present invention, that is a modification of the process illustrated in FIG. 3.

FIG. 9 is a flowchart illustrating a modification of the processing illustrated in FIG. 3 according to the second embodiment of the present invention.

At Step S30, the GOs of the queue 30-33 are calculated, similarly to the processing of Step S22.

At Step 531, the number of access requests to be fetched from the queues 30-33 is determined on the basis of a ratio among the GOs (4/1:4/3:4/3=3:1:1:1, in the case of FIG. 4). The total number of access requests to be fetched from the queues 30-33 is assumed to be 6. In the case of FIG. 4, the numbers of access requests to be fetched from the queues 30-33 are 3, 1, 1, and 1, respectively. A higher priority is given to an access request stored in a queue corresponding to the larger ratio among the GOs. When two or more queues have the same ratio among the GOs, the queue on the left in FIG. 4 is given higher priority.

Accordingly, the state of the queues illustrated in FIG. 4 transitions to the state illustrated in FIG. 5F, and the same process result in FIG. 3 is achieved.

It should be noted that other configurations and steps in this embodiment are the same as those in the first embodiment.

The present invention includes various other embodiments. For example, other designs can be used in which the above-described configuration and steps are each performed.

For example, the priority information 35 can be manually set by a user. The setting of the priority information 35 can also be changed dynamically using an executed process.

Further, the RAID controller 23 may be configured in software.

Moreover, the calculating formula of the GO is not limited in the above embodiments. Any calculating formula can be applied, as long as it includes the priority level and the number of access requests, and it is constructed such that at least one or all of access requests are stored in the access request queue, in such a manner that the higher the priority level of a logical disk corresponding to an access request and the greater the number of access requests to the logical disk corresponding to the access request, the greater the priority given to the access request is.

Furthermore, the criterion for determining whether the process of Step S10 proceeds to Step S14 in FIG. 2 is a threshold on the number of access requests in the second-level queue. The threshold is not limited to 0. The process proceeds from Step S10 to Step S14 if the number of the access requests is less than the threshold. In addition, the queue may be configured to store the address pointer *CB [=(offset value)+integer×(the number of words or bytes per block)] instead of the content of the *CB in the above embodiments.

What is claimed is:

1. An image forming apparatus having a Redundant Array of Inexpensive/Independent Disks (RAID) control unit, the RAID control unit comprising:
   an access request queue;
   an access request arbitrating unit configured to store access requests to a logical disk, sent from an operating system (OS), in the access request queue on the basis of fetch order determination information and to fetch the access requests; and
   a plurality of pre-access request queues configured to store the access requests corresponding to respective logical disks,
   wherein the fetch order determination information includes priority levels of each of the logical disks and the number of pending access requests to each of the logical disks,
   wherein the access request arbitrating unit is further configured to store the access requests in the access request queue at a predetermined timing in such a manner that the higher the priority level of the logical disk to which the particular access request is directed and the greater the number of pending access requests to the logical disk to which the particular access request is directed, the higher the priority given to the particular access request, and
   wherein the access request arbitrating unit is further configured to store each of the access requests in the one of the pre-access request queues that corresponds to the logical disk to which the access request is directed.

2. The image forming apparatus of claim 1, further comprising an access information converting unit configured to receive the fetched access requests from the access request queue, to convert logical disk access information corresponding to the access request into physical disk access information by referring to address conversion information, and to send a request for transferring of access information including the physical disk access information.

3. The image forming apparatus of claim 2, further comprising a transferring unit configured to transfer the access information to a RAID controller in response to the transfer request sent by the access information converting unit.

4. The image forming apparatus of claim 1,
   wherein the access information includes at least one selected from the group consisting of a physical disk name, a physical block address (PBA), a mode, a number of blocks, and a head address for access in a stream buffer.

5. The image forming apparatus of claim 1,
   wherein the access request arbitrating unit is further configured to determine the number of access requests to be fetched from each of the pre-access request queues on the basis of ratios of the number of pending access requests in each pre-access request queue to the priority level of the logical disk corresponding to each pre-access request queue.

6. The image forming apparatus of claim 1,
   wherein the access request arbitrating unit is configured to repeatedly process a first access request fetched from one of the pre-access request queues having a largest ratio of the number of pending access requests to the priority level of the corresponding logical disk.

7. The image forming apparatus of claim 1,
   wherein the predetermined timing is a point that the number of pending access requests in the access request queue is less than a threshold number of pending access requests.

8. A Redundant Array of Inexpensive/Independent Disks (RAID) control unit comprising:
   an access request queue;
   an access request arbitrating unit configured to store access requests to a logical disk, sent from an operating system (OS), in the access request queue on the basis of fetch order determination information and to fetch the access requests; and
   a plurality of pre-access request queues configured to store the access requests corresponding to the respective logical disks, wherein the fetch order determination information includes priority levels of each of the logical disks and the number of pending access requests to each of the logical disks, wherein the access requests arbitrating unit is further configured to store the access requests in the access request queue at a predetermined timing in such a manner that the higher the priority level of the logical disk to which the particular access request is directed and the greater the number of pending access requests to the logical disk to which the particular access request is directed, the higher the priority given to the particular access request, and wherein the access request arbitrating unit is configured to store each of the access requests in the one of the pre-access request queues that corresponds to the logical disk to which the access request is directed.

9. The RAID control unit of claim 8, further comprising an access information converting unit configured to receive the fetched access requests from the access request queue, convert logical disk access information corresponding to the access request into physical disk access information by referring to address conversion information, and send a request for transferring of access information including the physical disk access information.

10. The RAID control unit of claim 9, further comprising a transferring unit configured to transfer the access information to a RAID controller in response to the transfer request sent by the access information converting unit.

11. The RAID control unit of claim 8, wherein the access information includes at least one selected from the group consisting of a physical disk name, a physical block address (PBA), a mode, a number of blocks, and a head address for access in a stream buffer.

12. The RAID control unit of claim 8, wherein the access request arbitrating unit is further configured to determine the number of access requests to be fetched from each of the pre-access request queues on the basis of ratios of the number of pending access requests in each pre-access request queue to the priority level of the logical disk corresponding to each pre-access request queue.

13. The RAID control unit of claim 8, wherein the access request arbitrating unit is configured to repeatedly process a first access request fetched from one of the pre-access request queues having a largest ratio of the number of pending access requests to the priority level of the corresponding logical disk.

14. The RAID control unit of claim 8, wherein the predetermined timing is a point that the number of pending access requests in the access request queue is less than a threshold number of pending access requests.

* * * * *